May 20, 1930.  A. J. GRANBERG  1,759,396
SHUT-OFF AND INDICATOR CONTROL FOR OIL DISPENSING APPARATUS
Filed Jan. 3, 1925  4 Sheets-Sheet 1
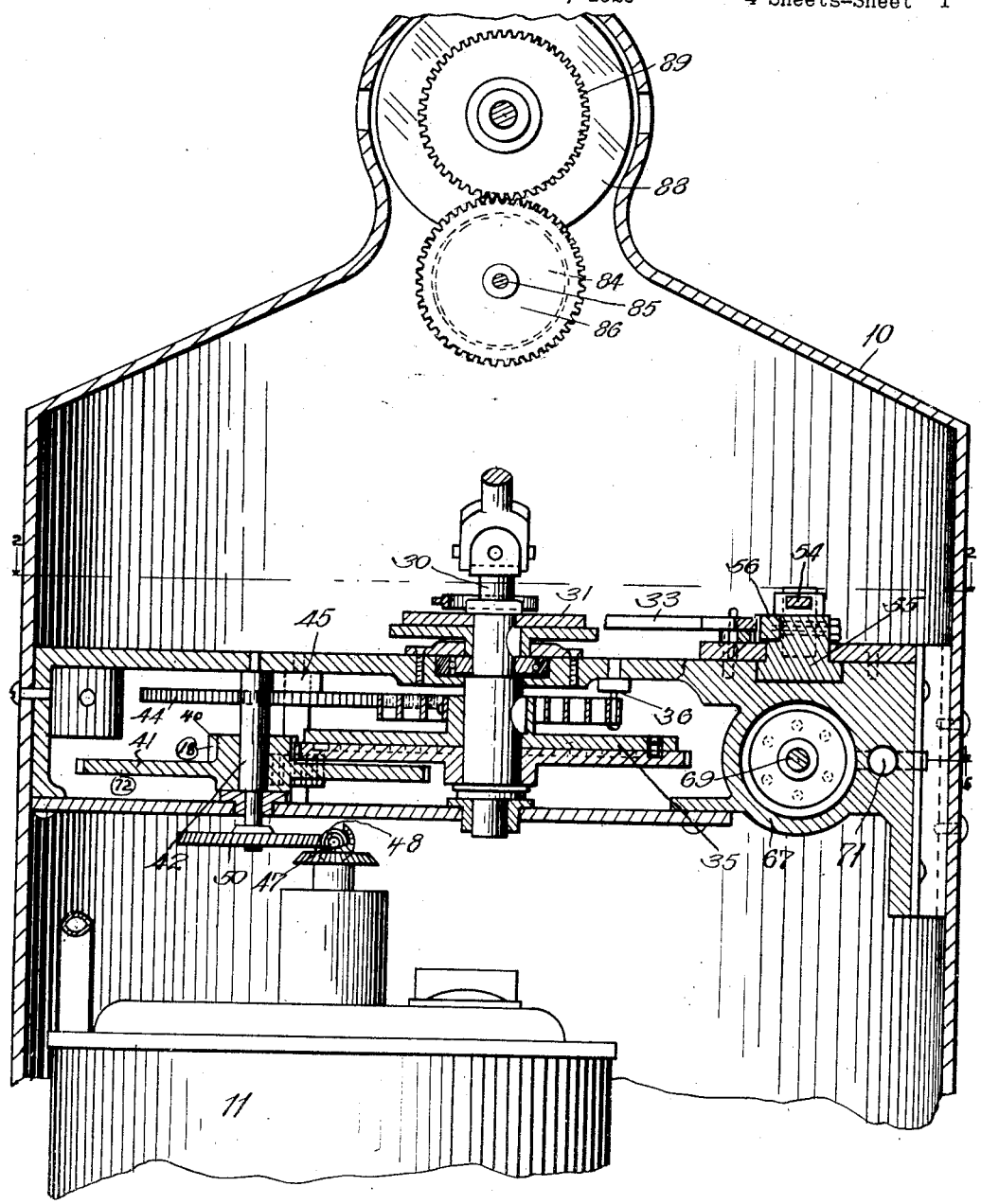
F1G. 1
INVENTOR.
ALBERT J. GRANBERG
BY
ATTORNEYS.

May 20, 1930. A. J. GRANBERG 1,759,396
SHUT-OFF AND INDICATOR CONTROL FOR OIL DISPENSING APPARATUS
Filed Jan. 3, 1925 4 Sheets-Sheet 2
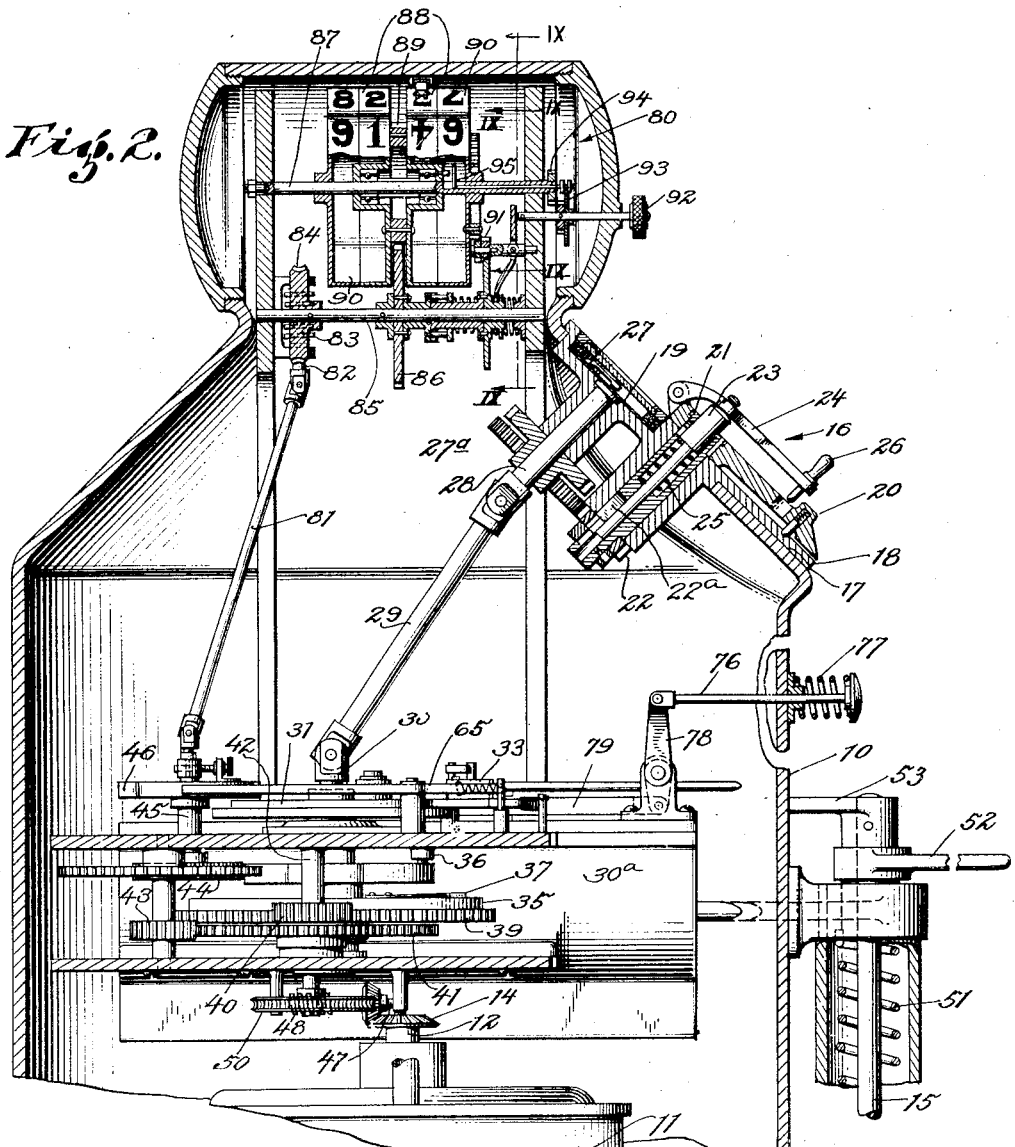
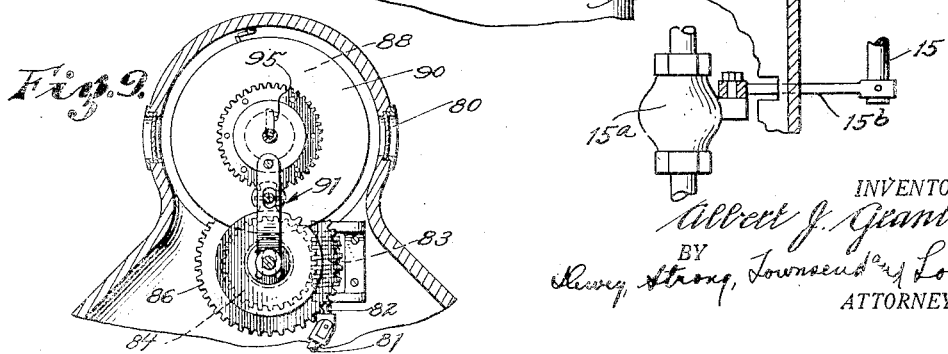
INVENTOR.
Albert J. Granberg
BY
Dewey Strong, Townsend & Loftus
ATTORNEYS.

May 20, 1930.  A. J. GRANBERG  1,759,396
SHUT-OFF AND INDICATOR CONTROL FOR OIL DISPENSING APPARATUS
Filed Jan. 3, 1925  4 Sheets-Sheet 3
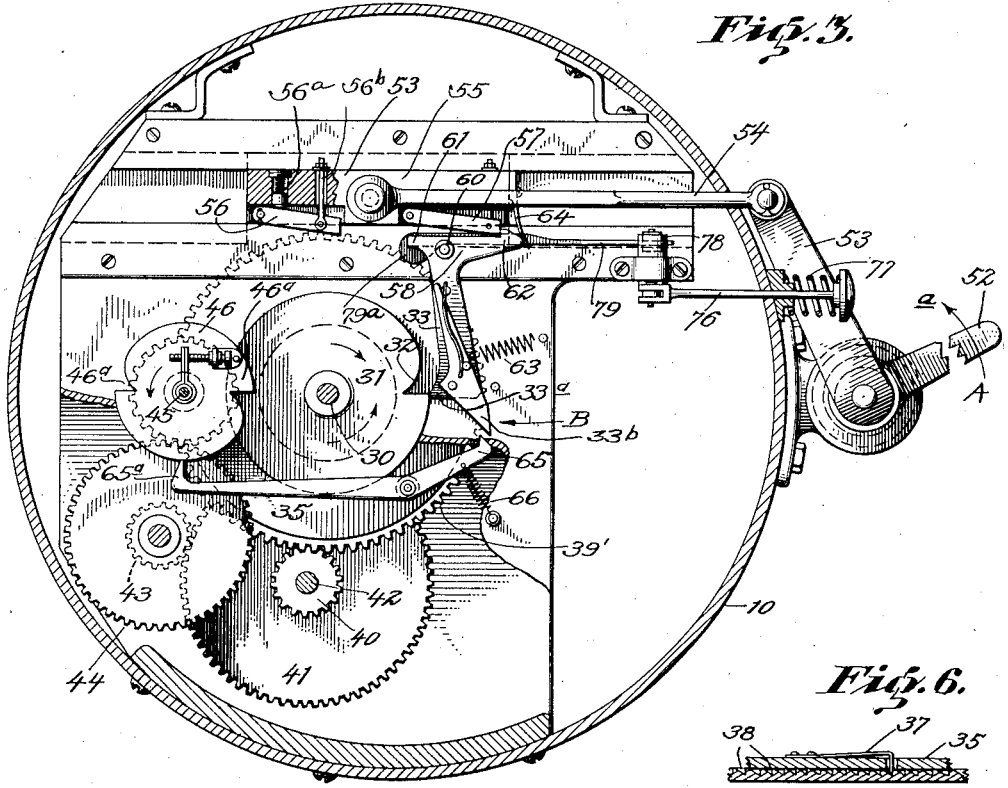
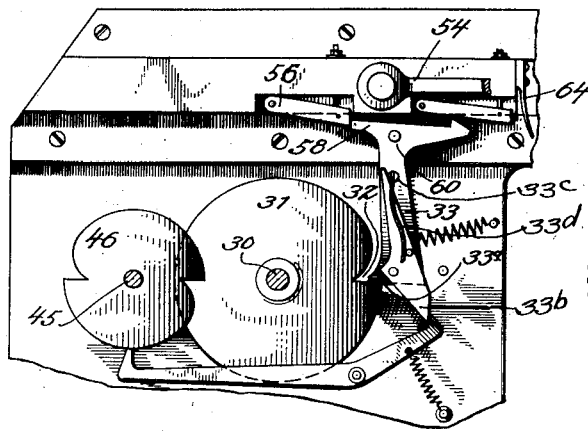
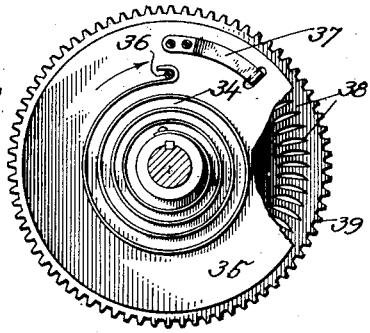
INVENTOR.
Albert J. Granberg
BY
Dewey, Strong, Townsend and Lofti
ATTORNEYS.

May 20, 1930.  A. J. GRANBERG  1,759,396
SHUT-OFF AND INDICATOR CONTROL FOR OIL DISPENSING APPARATUS
Filed Jan. 3, 1925    4 Sheets-Sheet 4

INVENTOR.
Albert J. Granberg
BY
Dewey, Strong, Townsend and Loftus
ATTORNEYS.

Patented May 20, 1930

1,759,396

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

SHUT-OFF AND INDICATOR CONTROL FOR OIL-DISPENSING APPARATUS

Application filed January 3, 1925. Serial No. 394.

This invention relates to fluid dispensing apparatuses and particularly pertains to an indicator and valve shutoff mechanism for use in connection with fluid dispensing apparatuses.

It is the principal object of the present invention to provide a generally improved indicating and shutoff valve operating mechanism for liquid dispensing devices, which mechanism is adapted to be operatively connected with a fluid meter and shutoff valve and capable of accurately indicating the volume of liquid being dispensed and causing said valve to close after a predetermined quantity of fluid has been dispensed; the said mechanism being self-contained and capable of being set at the operator's option to determine the amount of fluid to be dispensed.

In carrying out this object I provide a dispensing apparatus including a fluid meter having a shutoff valve which is operatively connected with a trip mechanism. This trip mechanism may be set by a setting device to determine the quantity of gasoline or fluid to be dispensed. The trip mechanism is provided with a driving motor and is governed by the meter so that when the predetermined quantity of fluid is dispensed, the trip mechanism automatically operates to close the valve. In connection with the trip mechanism, an indicator device is provided to indicate the quantity of fluid being dispensed during the operation of the mechanism.

One form which the invention may assume is exemplified in the following description and illustrated by way of example in the accompanying drawings, in which:

Fig. 1 is a view in vertical section through the upper end of a gasoline dispensing apparatus disclosing my improved mechanism in central section.

Fig. 2 is a similar view taken at right angles to Fig. 1 and disclosing the construction of my improved apparatus and its connection with the fluid meter and shutoff valve.

Fig. 3 is a view in plan section through the apparatus disclosing the trip mechanism of the device and its operative connection with the shutoff valve.

Fig. 4 is a fragmentary view in plan of the trip mechanism showing the parts in the position just prior to the closing of the shutoff valve.

Figs. 5 and 6 are fragmentary views of the spring motor of the trip mechanism showing the operative relation of the parts.

Fig. 9 is a section taken on line IX—IX of Fig. 2 showing the gear drive arrangement of the counting mechanism.

Figure 7:
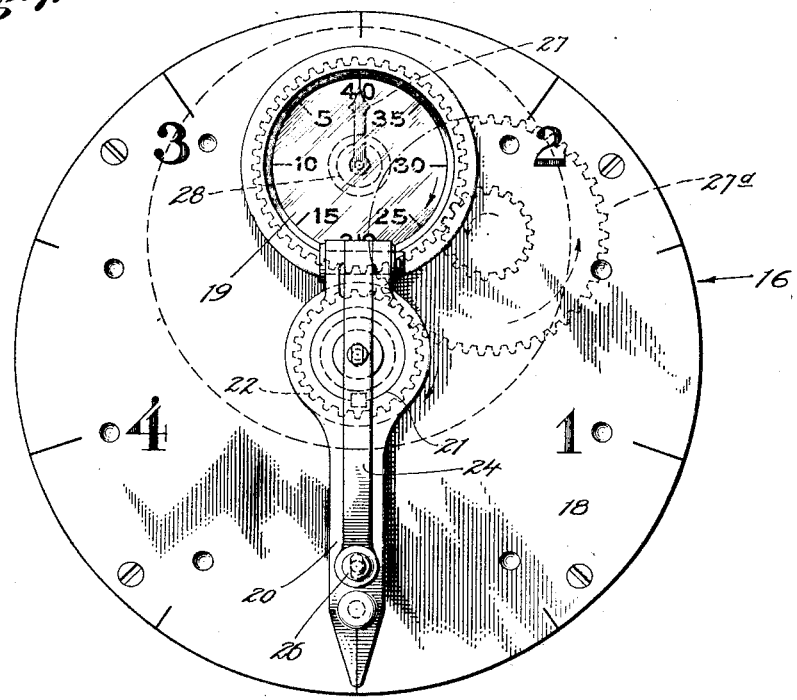
Fig. 7 is a view of the setting mechanism.

Referring more particularly to the accompanying drawings, I have illustrated my improved indicating and shutoff mechanism as embodied in a gasoline dispensing apparatus of the type employed by service stations and garages for dispensing gasoline to automotive vehicles. The present invention, however, may be embodied in various other forms and adapted for use in other capacities without departing from the invention.

In the drawings, 10 indicates a vertically disposed cylindrical casing enclosing a meter 11 to which gasoline from a storage tank is delivered when the apparatus is in use. This meter may be of any preferred design capable of accurately metering the gasoline delivered therefrom to a discharge or shutoff valve $15^a$ from whence it may be dispensed. This meter is equipped with an indicator drive shaft 12 fitted with a bevel gear 14 which is revolved at a certain definite ratio to the quantity of fluid metered by the meter 11.

The shutoff valve $15^a$ mentioned controls the discharge of the gasoline from the meter. The shutoff valve $15^a$ is a standard type of valve which is known as a quick acting gate valve. The valve member in this valve swings. This swinging valve member is connected through a linkage $15^b$ to the lower end of a vertical shaft 15 which is arranged exteriorly of the casing as shown in Fig. 2. The linkage $15^b$ is such that rotary movement of the vertical shaft 15 will open and close the valve $15^a$. Generally speaking, the present invention embodies mechanism operatively connected with the shutoff valve and meter and capable of being set so that after a predetermined quantity of gasoline has passed through the meter, the shutoff valve will be automatically closed. The mechanism is also equipped with an indicator for visibly indicating the quantity of gasoline dispensed. This mechanism is self-contained and is operatively connected to the meter in a manner whereby the operation of the meter governs the operation of the mechanism, so that synchronism of action between the two devices is obtained.

It should be stated that the meter is driven by the pressure of the fluid delivered thereto and consequently commences operating when the shutoff valve is opened. Likewise, it will cease operating when the shutoff valve closes.

Reference being had to Fig. 2 the device includes a setting mechanism 16 which is arranged on an oblique surface 17 of the casing. This setting mechanism comprises a large dial 18 suitably calibrated in units of 1 to 5. Arranged within the periphery of this dial 18 is a small dial 19 calibrated into multiples of five from 5 to 40, 40 being the maximum quantity of gasoline to be dispensed at one time by the present apparatus. For cooperation with the unit dial 18, I provide a setting lever 20 which is fixed on a sleeve 21 extending concentrically through the dial 18. The inner end of this sleeve 21 carries a spur pinion 22 which is normally rotatably mounted on the sleeve. This pinion 22 is collared into place on the sleeve 21 and is formed with a keyway adapted to register with a keyway in the sleeve 21. A reciprocable latch member 23 extends through the sleeve 21 and is fitted with a key 22ª which is capable when depressed of projecting into the registering keyways in the pinion 22 and in the sleeve 21 to connect the pinion 22 to the sleeve 21 so that it will be rotated by rotation of the setting lever 20.

To effect this connection a secondary lever 24 is pivotally connected to the setting lever 20 so that it will bear against the outer end of the latch member 23, which is normally held in its outermost position by a spring 25. The secondary lever 24 carries a handle 26 by which it may be pressed inwardly to effect a driving connection between the pinion 22 and the sleeve 21 and simultaneously moved to rotate the setting lever 20. The pinion 22 through the medium of a gear train 27ª drives a shaft 28, which extends parallel to the sleeve 21 and carries an indicating hand 27 at its upper end.

The gear ratio between the sleeve 21 which carries the setting lever and the shaft 28 which carries the hand 27 is 8 to 1, thus one complete revolution of the setting lever 18 will revolve the hand 27 one-eighth of a revolution so that it will register with the numeral 5 on the small dial. Likewise, one complete revolution of the setting lever 20 will register with the numeral 5 on the unit dial. Therefore, should the amount of gasoline to be dispensed be a number of gallons which is a multiple of five, take for example 15, the setting lever 20 is revolved three complete revolutions which will set the hand 27 into register with the numeral 15 on the small dial 19, returning the setting lever to the starting position. Should it be desired to dispense a number of gallons which is not a multiple of five, take for example 17 gallons, the setting lever 20 is revolved three complete revolutions which is equivalent to 15 gallons and then set in register with the numeral 2 on the unit dial. These settings of the lever set the mechanism so that the shutoff valve will be automatically closed after the quantity of gasoline predetermined by the setting of the mechanism has been dispensed.

To accomplish this, the shaft 28, which carries the hand 27, is operatively connected through a shaft 29 to a shaft 30 upon which a large escapement wheel 31 is mounted. I prefer to term this wheel 31 the forty gallon wheel, because it operates in unison with the hand 27 and is only revolved one complete revolution when the maximum amount of gasoline is to be dispensed.

This escapement wheel 31 is formed with a notch 32 in its peripheral edge which is in register with the trip end 33ª of a trip lever 33 when the setting mechanism is in neutral position. When operating the setting mechanism to set the apparatus so that a predetermined quantity of gasoline will be dispensed, the escapement wheel 31 is revolved in a counter-clockwise direction to position the notch 32 therein a definite distance from its neutral position so that when the wheel returns and registers with the trip end 33ª of the trip lever 33, the predetermined quantity of gasoline will have been dispensed and the wheel 31 will actuate the trip mechanism to close the shutoff valve.

During the setting of the wheel 31 which controls the trip mechanism, a spring motor is placed under tension to drive the wheel 31. This spring motor mechanism comprises a coil spring 34 which is wound about the shaft 30 beneath the escapement wheel 31. The inner end of this spring is fastened to the hub of a disk 35 which is secured on the shaft 30. As will be seen from Figs. 5 and 6 the outer end of the spring 34 is secured to a pin 36 fastened in the sub-frame 30ª which carries the escapement wheel shaft and its associate mechanism. When the wheel 31 is being set, the disk 35 will be rotated in unison therein in a counter-clockwise direction. This will place the spring under sufficient tension to drive the wheel 31 in a clockwise direction when the mechanism is placed in operation.

Reference being had to Figs. 4 and 5, it is seen that the disk 35 is fitted with a spring-pressed pawl 37 which engages ratchet teeth 38 formed in the top surface of a spur gear 39. This gear 39 is rotatably mounted on the shaft 30. The gear 39 drives a pinion 40 which is relatively fixed to a gear 41. The pinion 40 and gear 41 are secured on a vertical shaft 42 also carried by the sub-frame 30<sup>a</sup>. The gear 41 through the medium of an idler pinion 43 and idler gear 44 drives a shaft 45 which carries a small escapement wheel 46. The escapement wheel 46 is what I prefer to term a one gallon wheel, and it cooperates with the escapement wheel 31 in accurately controlling the mechanism so that the shutoff valve will be automatically closed when the exact amount of gasoline has been dispensed. This operation will be hereinafter described.

It is obvious from the drawings that during the setting of the wheel 31 and the winding of the spring motor 34 that the gear 39 and its connected mechanism including the shaft 45 and the wheel 46 will remain stationary due to the pawl and ratchet connection between the disk 35 and the gear 39, and the fact that the meter is idle during the setting of the mechanism. It is to be understood that the connection between the mechanism and the meter is such that the mechanism cannot drive the meter. However, when the meter commences operating, the escapement wheel 31 is revolved by the spring motor and the pawl 37 forms a driving engagement between the disk 35 and the gear 39, thus driving the shaft 45 through the medium of the gear train mentioned at a definite rate of speed relative to the escapement wheel 31. The gear ratio between the escapement wheel 46 and the escapement wheel 31 is 40 to 1, inasmuch as the escapement wheel 31 revolves one revolution for each forty gallons while the escapement wheel 46 revolves one revolution for each gallon dispensed.

As before stated the operation of the meter governs the operation of the trip mechanism. It does this by controlling the speed of the escapement mechanism permitting it to operate at a definite ratio relative to the operation of the meter. This is accomplished by providing a shaft 47 which is fitted with a worm 48 and a bevel gear 49, the latter being in mesh with the bevel gear 14 on the indicator drive shaft 12 of the meter as shown in Fig. 2. The worm 48 is in mesh with a worm gear 50 fixed on the shaft 42 which carries the intermediate pinion and gear 40 and 41. As the worm gear 50 cannot drive the worm 48, the speed of the shaft 42 and consequently the speed of the escapement wheels will be regulated by the operation of the meter. The spring motor permits the worm gear 50 to follow the worm 48 and drive the wheels and gear train without placing any driving burden on the meter.

To permit the trip mechanism to automatically close the shutoff valve after a predetermined quantity of gasoline has been dispensed, the shaft 15 of the valve is fitted with a spring 51 which constantly tends to maintain the valve closed. At its upper end the shaft 15 is fitted with an operating handle 52 by means of which the valve may be opened. Also secured to the upper end of the valve operating shaft 15 is a lever 53 which is connected by a pitman 54 to a slide 55. This slide 55 is guided in the sub-frame 30<sup>a</sup> for reciprocable movement. Carried by the slide is a pair of spaced pawls 56 and 57. These pawls are located in recesses formed in one side of the slide and are each fitted with spring press members 56<sup>a</sup> exerting a pressure on the pawls to force their free ends outwardly. The pawls are also fitted with limit members 56<sup>b</sup> to limit the outward movement of the pawls. These pawls are adapted to engage the latch end 58 of the pivotal trip lever 33. The latch end of the trip lever extends at right angles to the trip end 33<sup>a</sup> thereof and upon opposite sides of the pivotal point 60 of the trip lever 33. The opposite ends of the latch end of the lever are designated by the numerals 61 and 62.

A spring 63 is provided which normally retains the trip end 33<sup>a</sup> of the trip lever 33 out of engagement with the escapement wheel 31 and also positions the end 62 of the latch end of the lever 33 in the path of the pawls 56 and 57 so that it will engage therewith. After the trip mechanism has been set, the lever 52 is swung in the direction of the arrow A in Fig. 3 to open the valve. This moves the slide 55 inwardly causing the pawl 57 to engage with the latch end 62 of the trip lever maintaining the valve open with the slide in its innermost position, and placing the valve closing spring 51 under tension.

When the parts are in this position a flat spring 64 carried by the slide 55 bears against the end 62 of the trip lever 33 and tends to overcome the tension of the spring 63 and swing the trip lever 33 in the direction of the arrow B in Fig. 3. This tends to disengage the end 62 of the lever 33 from the pawl 57 of the slide, which disengagement is prevented by engagement of the trip end 33<sup>a</sup> of the trip lever 33 with the peripheral surface of the escapement wheel 31 until the notch 32 aligns with the trip end 33<sup>a</sup> of the lever 33.

When the notch 32 of the wheel 31 registers with the trip end 33<sup>a</sup> of the trip lever 33, the spring 64 will swing the trip end 33<sup>a</sup> of the lever 33 into engagement with the notch, releasing the slide 55 and permitting the valve operating spring 51 to move the slide outwardly. When the lever swings free of the pawl 57, it is immediately latched into position by a trigger lever 65, as shown in Fig. 4. In this position the end 61 of the lever 33 is interposed in the path of the pawl 56 and the slide is moved outwardly by the valve closing spring 51, until the pawl 56 engages the end 61 of the trip lever 33. Reference being had to Fig. 4 it will be seen that a trip finger 33<sup>b</sup> is pivotally mounted on the trip lever 33. A stop 33<sup>c</sup> is provided to limit the pivotal movement of this trip finger 33<sup>b</sup> in one direction, while a flat spring 33<sup>d</sup> tends to constantly maintain the lever in a set position against the stop. This spring 33<sup>d</sup>, however, permits the trip finger 33<sup>b</sup> to be yieldable in one direction so that it may pass over the adjacent end of the trigger 65 when the trip lever 33 moves into the notch 32 of the wheel 31. After the trip finger 33<sup>b</sup> passes over this trigger 65, the lever 33 is latched from moving outwardly relative to the disk 31 due to the engagement of the finger 33<sup>b</sup> with the trigger 65. It is seen that the trip finger 33<sup>b</sup> cannot swing so as to pass over the trigger 65 in the outward direction as its end engages a stop 33<sup>c</sup>.

The outward movement of the slide is not sufficient to entirely close the shutoff valve. The shutoff valve is not permitted to entirely close until one of the notches 46<sup>a</sup> in the one gallon escapement wheel 46 registers with the inturned end 65<sup>a</sup> of the trigger finger 65. When such registration occurs, a spring 66 causes the trigger lever 65 to release the trip lever 33. By this time the spring 64 carried by the slide 55 is moved from engagement with the trip lever 33 so that the spring 63 will swing the trip end of the trip lever 33 outwardly relative to the wheel 31. This movement of the trip lever 33 will disengage its end 61 from the pawl 56 permitting the slide to complete its outward stroke as urged by the spring 51, thus permitting the valve to completely close.

From Fig. 3 it will be noted that the wheel 46 is formed with diametrically opposed notches 46<sup>a</sup>. These notches are provided should it be desired to dispense gasoline in half gallons.

The wheels 31 and 46 are so relatively positioned that the notch 32 in the wheel 31 will register with the trip end 33<sup>a</sup> of the trip lever 33 slightly prior to the time that one of the notches 46<sup>a</sup> in the wheel 46 will register with the inturned end 65<sup>a</sup> of the trigger 65. Due to the relatively greater speed of the wheel 46, the register of the notches 32 and 46<sup>a</sup> with their respective detents comes in rapid succession.

I intend to control the valve shutoff so as to allow a slow and then final and quick valve closure or a sequence of partial shutoffs before the final closure. That is to say, when the escapement wheel 31 releases the slide, the closing movement of the slide is resisted so that it will be comparatively slow, but when the trigger lever is released, the valve will snap to final closure.

I accomplish this by providing an oil cylinder 67 in the sub-frame. This cylinder is fitted with a piston 68 connected by a piston rod 69 to a lever 70 fixed on the valve operating shaft 15. The cylinder 67 and its associate mechanism is disposed directly below the slide 55. This oil cylinder 67 is provided with a by-pass passageway 71 communicating with the interior of the cylinder by ports 72, 73 and 74. The piston 68 is formed with ports controlled by a valve 75 so that when the main shutoff valve is opened by action of the lever 52, the piston may move freely inwardly in the cylinder 67 against the pressure of the fluid, as the latter may pass freely through the ports in the piston.

In closing the shutoff valve however, the check valve 75 maintains the ports in the piston closed so that the oil must be discharged through the ports 73 and 74 as the piston advances toward the outer end of the cylinder. When the trip mechanism is actuated to permit the valve operating spring 51 to close the valve, the lever 70 tends to draw the piston 68 outwardly. This movement of the piston forces the oil out of the cylinder 67 through the ports 73 and 74, the oil by-passing through the passageway 71 to the opposite end of the cylinder through the restricted port 72 which retards the movement of the piston. At the end of the first closing action of the valve, the piston 68 is positioned intermediate the ports 73 and 74 and when the final closing action of the valve takes place, the piston may move quickly as the oil will have free passage out of the cylinder and into its opposite end through the restricted port 72 and unrestricted port 73.

It is obvious that by the provision of this mechanism the valve will be shutoff gradually, which is a considerable advantage in this type of apparatus.

For use in an emergency, I have provided a mechanism for releasing the slide from the trip lever 33 independently of the escapement wheels 31 and 46. This mechanism comprises a push rod 76 which extends outwardly through the casing 10 adjacent the operating lever 52. The outer end of this rod 76 is provided with a button between which and the casing an expansion spring 77 is interposed. The inner end of the rod 76 connects with the upper end of a lever 78 which is centrally pivoted to the subframe. The lower end of the centrally pivotal lever 78 connects with one end of a release lever 79. The other end 79<sup>a</sup> of the lever 79 is cam like and is adapted to engage the pivot pin 60 of the trip lever 33.

When the rod 76 is pushed inwardly, the cam surface of the inner end of the release lever 79 causes the lever to move against the pawl 57, releasing it from engagement with the trip lever 33 and permitting the spring 51 of the valve operating shaft to move the slide outwardly in a direction tending to close the valve. While in this position the pawl 56 of the slide 55 will strike the cam end of the release lever 79 and be held from engagement with the end 61 of the trip lever 33, the effect being to permit the slide its full amount of outward movement without interruption so as to completely close the shutoff valve.

In connection with the trip mechanism for closing the shutoff valve after a predetermined quantity of gasoline has been dispensed, I have provided indicating mechanism generally indicated at 80, which is mounted in a horizontally disposed cylinder at the top of the casing 10. This cylinder is provided with windows at opposite sides so that the quantity of gasoline being dispensed may be readily observed. The indicating mechanism is driven from the shaft 45 which carries the escapement wheel 46. This connection comprises a shaft 81 leading from the shaft 45 to a shaft 82 of the indicating mechanism. This shaft 82 carries a worm 83 which is in mesh with a worm gear 84 carried on a horizontally disposed shaft 85. This shaft is fitted with a spur gear 86. Above the shaft 85 I dispose a second shaft 87 carrying a pair of digit wheels 88. The numerals on these wheels are oppositely disposed so that they will display the same reading at opposite sides of the casing, the window in one side of the casing being in register with one wheel, and the window in the opposite side being in register with the opposite wheel. These digit wheels 88, however, are secured together and are fitted with a spur gear 89, which is driven by the gear 86 on the shaft 85.

Secured on the shaft 87 at the side of each digit wheel is a tens wheel 90. These wheels are revolved intermittently one-tenth of a revolution each time the digit wheels 88 revolve one complete revolution. The tens wheels 90 are operated from the shaft 85 through the medium of a gear train 91 which is so constructed as to drive the tens wheels 90 intermittently one-tenth of a revolution each time the unit wheels make one complete revolution. The numerals on the tens wheels 90 are oppositely disposed similar to the unit wheels so that the quantity of gasoline to be dispensed will be displayed from opposite sides of the casing.

It should be stated that the gear 86 is driven frictionally from the shaft 85. A clutching arrangement is provided between the gear 86 and the gear train 91 for driving the tens wheels. This arrangement permits the unit and tens wheels to be set back to zero by means of an operating knob 92. By pushing this knob inwardly, the clutching arrangement between the gear 86 and the tens wheels gear train is disengaged and the spring pressure on the gear 86 is released, so that the latter will be free to turn on the shaft. Coincidently with this, a gear 93 connected to the knob 92 is placed in mesh with a gear 94 fixed on the shaft 87, so that rotation of the knob 92 will return the tens wheels to zero. When the knob 92 is pressed inwardly, it causes engagement between return pin 95 with an abutment on the unit wheels so that rotation of the knob will likewise return the unit wheels to zero position.

In describing the operation of the device it will be assumed that the shutoff valve is in closed position, which would mean that the slide 55 would be in its outermost position and the notch 32 in the escapement wheel 31 would be in alignment with the trip lever end 33ª of the trip lever 33. The trip end of the lever 33 would not be in engagement with the notch of the wheel however due to the provision of the spring 63. Assuming that it was desired to dispense 15 gallons, the lever 24 is depressed to connect the sleeve shaft 21 of the lever 20 with the pinion 22. By means of the lever 24, the lever 20 may be revolved three complete revolutions about the dial 18 which will move the hand 27 in register with the numeral 15 on the small dial 19.

It will be noted that sockets 20ª are provided adjacent each calibration on the large dial 18 which may be engaged by a spring-pressed pin carried by the lever 20 to retain it in set position. By setting the lever 20, the large escapement wheel 31 is rotated in an anti-clockwise direction a partial revolution. During the setting of this wheel the spring motor will be wound up through the medium of the disk 35, as described. The mechanism will remain in set position until the valve is opened by means of the lever 52 which permits the meter to commence operating.

When the lever 52 of the valve actuating shaft 15 is swung in the direction of the arrow A in Fig. 3, the slide 55 is moved inwardly and the shutoff valve is opened. At the inner end of the stroke of the slide 55 the pawl 57 thereon engages the trip lever 33 and such engagement will maintain the slide in its innermost position and hold the valve open.

As soon as the valve is open the meter will commence operating and permit operation of the trip mechanism. The escapement wheel 31 will revolve in direct ratio to the operation of the meter due to the governing connection between the trip mechanism and the meter. The meter will not drive the wheel however as the latter will be driven by the spring 34. The connection between the meter and the trip drive mechanism is only a governing one so that the trip mechanism will operate synchronously with the meter.

During the operation of the trip mechanism, the shaft 45 will be driven at a gear ratio with respect to the escapement wheel and will, through the shaft 81, drive the indicating mechanism 80. The geared connection between the shaft 45 and the indicator wheels 88 and 90 will display the correct amount of gasoline being dispensed.

As the delivery of the predetermined quantity of gasoline is being completed, the notch 32 of the escapement wheel 31 will align with the trip end 33ª of the trip lever 33, causing the spring 64 to swing the trip lever from engagement with the pawl 57 on the slide. This cannot be accomplished until the notch 32 is in alignment with the trip end of the lever as the trip end will ride on the peripheral surface of the cam until the notch registers therewith.

When the pawl 57 disengages from the trip lever 33, the slide 55 will be moved outwardly due to the force of the valve closing spring 51. The moment that the trip end 33ª of the trip lever 33 moves into engagement with the notch 32 of the escapement wheel 31, the trigger 65 will latch the trip lever in this position, as shown in Fig. 4, interposing the end 61 of the trip lever 33 in the path of the pawl 56 on the slide 55, preventing the slide 55 from moving outwardly its full stroke and entirely closing the valve.

Figure 8:
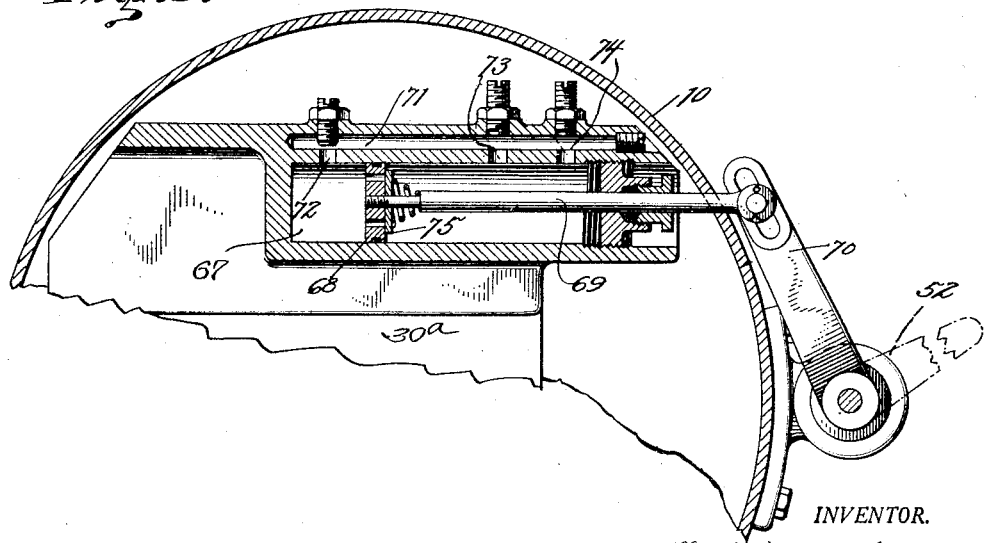
Fig. 8 is a fragmentary view in plan section through the mechanism by which the valve closing action is retarded.

It is seen from Figs. 3 and 4 that immediately the slide 55 moves outwardly that the spring 64 will disengage therefrom and that the spring 63 will exert a tension on the lever 33 in a direction tending to disengage it from the escapement wheel. This is prevented, however, by the provision of the trigger 65. The outward movement of the slide 55 will be cushioned by the cushioning mechanism disclosed in Fig. 8, which is a dash pot arrangement as previously described to retard the closing movement of the valve.

During the operation of the large wheel 31, the one gallon or small escapement wheel 46 is continuously rotated at a ratio of forty to one with respect to the large one. Immediately after the notch 32 in the escapement wheel 31 registers with the trip end of the lever 33, the notch 46ª in the small escapement wheel 46 will register with the inturned end of the trigger 65. This will permit the trigger 65 to swing about its pivot and release the trip lever 33. Such release of the trip lever will be accompanied by disengagement of the pawl 56 on the slide 55 and permit the slide 55 to move outwardly the remainder of stroke and entirely close the shutoff valve. Immediately the shutoff valve closes, the meter ceases operating and the device becomes idle.

As the quantity of gasoline passing through the meter during a certain number of revolutions thereof is known, it can be accurately connected with the trip mechanism so that a predetermined amount of rotation of the wheel 31 will determine the period of operation of the meter, and permit the valve to remain open while a definite quantity of gasoline is being dispensed from the meter. As the trip mechanism is directly associated with the setting mechanism, the quantity to be dispensed may be predetermined and entirely regulated by the setting of the lever 20.

As the indicating mechanism 80 is operatively connected to the trip mechanism, the former will operate synchronously with the trip mechanism and display the quantities of gasoline being dispensed as the trip mechanism operates. By manipulating the member 92 of the indicating mechanism, the latter may be set to zero after each operation of the device. It is obvious that the hand 27 will retrograde with the wheel 31 and will return to starting position when the wheel 31 reaches tripping position. The lever 20 may be set back to starting position without interfering with any of the other mechanism, as it is rendered freely turnable with respect to the pinion 22 by the release of the lever 24.

While dispensing fluid, should it be desired for any reason to immediately shutoff the device, it is only necessary to depress the push rod 76 of the emergency stop mechanism. By depressing the member 76 against the tension spring 77, a pull will be exerted on the member 79. This member, as described, is provided with a cam end capable of disengaging the pawl 57 from the trip lever 33, thus permitting the slide to move outwardly and close the valve. The cam end of the member 79 will also be disposed in the path of the pawl 56 so that the latter will not engage the trip mechanism, and the outward movement of the slide 55 will be uninterrupted so as to completely close the shutoff valve.

While I have shown the preferred form of my invention, it is to be understood that various changes in its construction may be made by those skilled in the art without departing from the spirit of the invention, as defined in the appended claims.

Having thus described my invention, what I claim and desire to secure by Letters Patent is:

1. In combination with a fluid meter and a shutoff valve, a trip mechanism for retaining said valve open after it has been opened, a control mechanism adapted upon reaching tripping position to release said trip mechanism and permit said valve to close, said control mechanism being governed by the meter and operating in direct ratio thereto, and means for setting said control mechanism back from tripping position to predetermine the operative period of the meter prior to permitting the valve to close, a spring motor included in the control mechanism and adapted to be wound when setting back the control mechanism and capable of advancing the control mechanism to tripping position after the latter has been set and the valve has been opened.

2. In combination with a fluid meter and a shutoff valve, a trip mechanism for retaining said valve open after it has been opened, a control mechanism adapted upon reaching tripping position to release said trip mechanism and permit the valve to close, said control mechanism being governed by the meter and operating in direct ratio thereto, a setting mechanism for setting said control mechanism back from tripping position to predetermine the operative period of the meter prior to permitting the valve to close, and indicating means associated with the setting mechanism whereby the amount said control is set back from tripping position may be determined by the quantity of fluid it is desired to pass through the meter, a spring motor included in the control mechanism and adapted to be wound when the control mechanism is set back from tripping position, said motor being adapted to advance the control mechanism to tripping position after the control mechanism has been set and the valve opened, said spring motor being of sufficient strength to operate the control mechanism but insufficient to affect the operation of the meter.

3. In combination with a fluid meter and a shutoff valve, a trip mechanism for retaining said valve open after it has been opened, a control mechanism adapted upon reaching tripping position to release said trip mechanism and permit the valve to close, said control mechanism being governed by the meter and operating in direct ratio thereto, and means for setting said control mechanism back from tripping position so that it will reach tripping position and release said trip mechanism after a predetermined amount of operation, and emergency release means operative at any time after the valve has been opened to render the trip means inffective and permit the valve to close.

4. In combination with a fluid meter and a shutoff valve, a trip mechanism for retaining said valve open after it has been opened, a control mechanism adapted upon reaching tripping position to release said trip mechanism and permit said valve to close, said control mechanism being governed by the meter and operating in direct ratio thereto, and means for setting said control mechanism back from tripping position to predetermine the operative period of the meter prior to permitting the valve to close, a spring motor included in the control mechanism and adapted to be wound when setting back the control mechanism and capable of advancing the control mechanism to tripping position after the latter has been set and the valve has been opened, and emergency release means operative at any time after the valve has been opened to render the trip means ineffective and permit the valve to close.

5. In combination with a fluid meter and a shutoff valve, a trip mechanism for retaining said valve open after it has been opened, a control mechanism adapted upon reaching tripping position to release said trip mechanism and permit the valve to close, said control mechanism being governed by the meter and operating in direct ratio thereto, a setting mechanism for setting said control mechanism back from tripping position to predetermine the operative period of the meter prior to permitting the valve to close, indicating means associated with the setting mechanism whereby the amount said control is set back from tripping position may be determined by the quantity of fluid it is desired to pass through the meter, and emergency release means operative at any time after the valve has been opened to render the trip means ineffective and permit the valve to close.

6. In combination with a fluid meter and a shutoff valve, a trip mechanism for retaining said valve open after it has been opened, a control mechanism adapted upon reaching tripping position to release said trip mechanism and permit the valve to close, said control mechanism being governed by the meter and operating in direct ratio thereto, a setting mechanism for setting said control mechanism back from tripping position to predetermine the operative period of the meter prior to permitting the valve to close, indicating means associated with the setting mechanism whereby the amount said control is set back from tripping position may be determined by the quantity of fluid it is desired to pass through the meter, a spring motor included in the control mechanism and adapted to be wound when the control mechanism is set back from tripping position, said motor being adapted to advance the control mechanism to tripping position after the control mechanism has been set and the valve opened, and emergency release means operative at any time after the valve has been opened to render the trip means ineffective and permit the valve to close.

7. In combination with a fluid meter and a shutoff valve, a trip mechanism for retaining said valve open after it has been opened, a revoluble control member operatively associated with the trip mechanism and adapted to trip the same upon reaching tripping position, an operative connection between said control member and said meter whereby the control member will operate in direct ratio to the meter and be governed thereby, means for setting said control member back from tripping position to predetermine the operative period of the meter prior to permitting the valve to close, said connection between the revoluble control member and said meter being ineffective when setting back the control member, a driving mechanism effective in revolving the control member and advancing it toward tripping position after the control member has been set back and the valve has been opened, and indicating means associated with the setting means whereby the amount said control member is set back may be determined by the quantity of fluid it is desired to pass through the meter.

8. In combination with a fluid meter and a shutoff valve, means constantly urging the valve to close, a reciprocable member operatively connected to the valve, a trip mechanism, cooperative latch means included in the reciprocable member and trip mechanism for latching the reciprocable member in position retaining the valve open when the latter is opened, a control mechanism adapted upon reaching tripping position to release said trip mechanism and permit the valve to close, an operative connection between said control mechanism and said meter whereby the former will be governed by the meter and will operate in direct ratio thereto, said connection being ineffective when setting back the control mechanism from tripping position, means for setting said control mechanism back from tripping position to predetermine the operative period of the meter prior to permitting the valve to close, and a spring motor included in said control mechanism and adapted to be wound when setting back the control mechanism and capable of advancing the control mechanism toward tripping position in synchronism with the meter after said control mechanism has been set back and said valve has been opened.

9. In combination with a fluid meter and a shutoff valve, means constantly urging the valve to close, a reciprocable member operatively connected to the valve, a trip mechanism, cooperative means included in the reciprocable member and the trip mechanism for latching the reciprocable member in position and retaining the valve open after the latter has been opened, a control mechanism operatively associated with the trip mechanism to disengage the latching connection between the trip mechanism and the reciprocable member when the control member reaches tripping position, said control member being governed by the meter and operating in direct ratio thereto, means for setting said control mechanism back from tripping position to predetermine the operative period of the meter prior to permitting the valve to close, said control mechanism advancing to tripping position synchronously with the operation of the meter after the valve has been opened, means operatively associated with the control mechanism and the trip mechanism causing the latter to release said reciprocable member in successive steps closing the valve in successive steps, and indicating means associated with the setting mechanism whereby the amount said control mechanism is set back may be determined by the quantity of fluid it is desired to pass through the meter.

10. In combination with a fluid meter and a shutoff valve, means constantly urging the valve to close, a reciprocable member operatively connected to the valve, a trip mechanism, cooperative means included in the reciprocable member and the trip mechanism for latching the reciprocable member in position and retaining the valve open after the latter has been opened, a control mechanism operatively associated with the trip mechanism to disengage the latching connection between the trip mechanism and the reciprocable member when the control member reaches tripping position, said control member being governed by the meter and operating in direct ratio thereto, means for setting said control mechanism back from tripping position to predetermine the operative period of the meter prior to permitting the valve to close, said control mechanism advancing to tripping position synchronously with the operation of the meter after the valve has been opened, means operatively associated with the control mechanism and the trip mechanism causing the latter to release said reciprocable member in successive steps closing the valve in successive steps, and an emergency release means operative at any time after the valve has been opened to render the trip means ineffective and permit the valve to close.

11. In combination with a fluid meter and a shutoff valve, means constantly urging the valve to close, a reciprocable member operatively connected to the valve, a trip mechanism, cooperative latch means included in the reciprocable member and trip mechanism for latching the reciprocable member in position retaining the valve opening when the latter is opened, a control mechanism adapted upon reaching tripping position to release said trip mechanism and permit the valve to close, an operative connection between said control mechanism and said meter whereby the former will be governed by the meter and will operate in direct ratio thereto, said connection being ineffective when setting back the control mechanism from tripping position, means for setting said control mechanism back from tripping position to predetermine the operative period of the meter prior to permitting the valve to close, a spring motor included in said control mechanism and adapted to be wound when setting back the control mechanism and capable of advancing the control mechanism toward tripping position in synchronism with the meter after said control mechanism has been set back and said valve has been opened, and an emergency release means operative at any time after the valve has been opened to render the trip means ineffective and permit the valve to close.

12. In combination with a fluid meter and a shutoff valve, means constantly urging the valve to close, a reciprocable member operatively connected to the valve, a trip mechanism, cooperative means included in the reciprocable member and the trip mechanism for latching the reciprocable member in position and retaining the valve open after the latter has been opened, a control mechanism operatively associated with the trip mechanism to disengage the latching connection between the trip mechanism and the reciprocable member when the control member reaches tripping position, said control member being governed by the meter and operating in direct ratio thereto, means for setting said control mechanism back from tripping position to predetermine the operative period of the meter prior to permitting the valve to close, said control mechanism advancing to tripping position synchronously with the operation of the meter after the valve has been opened, means operatively associated with the control mechanism and the trip mechanism causing the latter to release said reciprocable member in successive steps closing the valve in successive steps, and indicating means associated with the setting mechanism whereby the amount said control mechanism is set back may be determined by the quantity of fluid it is desired to pass through the meter, and emergency release means operative at any time after the valve has been opened to render the trip means ineffective and permit the valve to close.

13. In combination with a fluid meter and a shutoff valve, means constantly urging the valve to close, a reciprocable member operatively connected to the valve, a trip mechanism, cooperative latch means included in the reciprocable member and trip mechanism for latching the reciprocable member in position retaining the valve open when the latter is opened, a control mechanism adapted upon reaching tripping position to release said trip mechanism and permit the valve to close, an operative connection between said control mechanism and said meter whereby the former will be governed by the meter and will operate in direct ratio thereto, said connection being ineffective when setting back the control mechanism from tripping position, means for setting said control mechanism back from tripping position to predetermine the operative period of the meter prior to permitting the valve to close, a spring motor included in said control mechanism and adapted to be wound when setting back the control mechanism and capable of advancing the control mechanism toward tripping position in synchronism with the meter after said control mechanism has been set back and said valve has been opened, indicating means associated with the setting mechanism whereby the amount said control mechanism is set back may be determined by the quantity of fluid it is desired to pass through the meter, and emergency release means operative at any time after the valve has been opened to render the trip means ineffective and permit the valve to close.

In testimony whereof I affix my signature.

ALBERT J. GRANBERG.